Jan. 21, 1964 R. A. DEIBEL ETAL 3,118,164
WINDSHIELD WIPER
Filed June 27, 1963 4 Sheets-Sheet 1

INVENTORS.
RAYMOND A. DEIBEL,
WILLIAM C. RIESTER
BY AND RAYMOND D. PAGE.
E. Herbert Liss
ATTORNEY.

Jan. 21, 1964   R. A. DEIBEL ETAL   3,118,164
WINDSHIELD WIPER
Filed June 27, 1963   4 Sheets-Sheet 2

INVENTOR.
RAYMOND A. DEIBEL,
BY WILLIAM C. RIESTER
AND RAYMOND D. PAGE.
Herbert Liss
ATTORNEY.

Jan. 21, 1964
R. A. DEIBEL ETAL
3,118,164
WINDSHIELD WIPER
Filed June 27, 1963
4 Sheets-Sheet 3
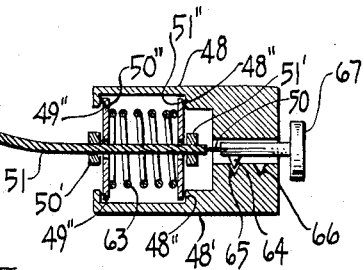
Fig. 8
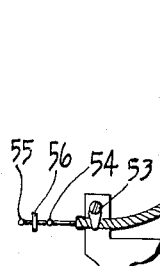
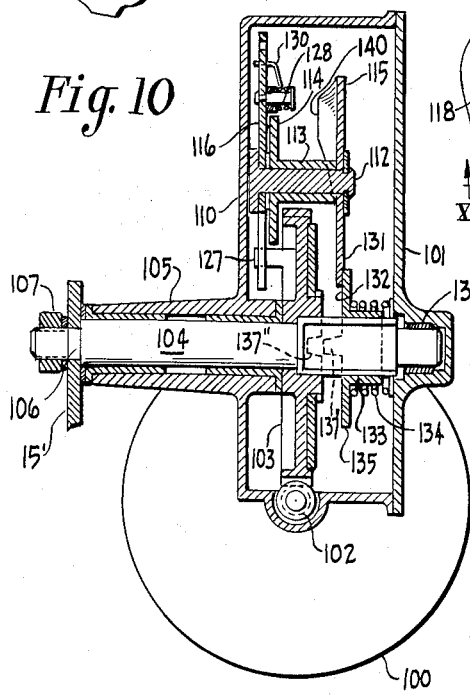
Fig. 10
Fig. 9
Fig. 11
INVENTOR.
RAYMOND A. DEIBEL,
WILLIAM C. RIESTER
BY AND RAYMOND D. PAGE
E. Herbert Liss
ATTORNEY.

Jan. 21, 1964    R. A. DEIBEL ETAL    3,118,164
WINDSHIELD WIPER

Filed June 27, 1963    4 Sheets-Sheet 4

INVENTOR.
RAYMOND A. DEIBEL,
WILLIAM C. RIESTER
BY AND RAYMOND D. PAGE.

ATTORNEY.

United States Patent Office 3,118,164
Patented Jan. 21, 1964

3,118,164
WINDSHIELD WIPER
Raymond A. Deibel, Cheektowaga, William C. Riester, Williamsville, and Raymond D. Page, Eggertsville, N.Y., assignors to Trico Products Corporation, Buffalo, N.Y.
Filed June 27, 1963, Ser. No. 291,159
11 Claims. (Cl. 15—250.12)

The present invention relates to an improved windshield wiper system for use with rotary motors and, more particularly, to windshield wiper system of the type in which the wiper remains parked during a controlled portion of each cycle of wiper operation.

Conventional wipers have been confined to constant motion wiping generally limited, particularly in electric wipers, to one of two ranges of blade travel velocity. Under certain road conditions, such as light rain or wet roads, where splashback from a vehicle creates a wet-dry condition on the windshield of a vehicle, constant motion wiping may cause smearing and obscure the vision of the driver. Under such conditions the wiper element may be inadequately lubricated, causing undue wear on the wiper blade as well as hazardous vision conditions. To overcome these problems, it is desirable to provide a windshield wiper system in which the wiper remains in a parked position for an interval of the time after a wiping operation and then automatically resumes wiper operation, thus automatically providing windshield wiping with intermittent dwell periods.

With intermittent motion, better visibility results from a combined wiping and evaporation process utilizing the car-created windstream between intermittent cycling to evaporate the residue of wetness. This intermittent dwell type of operation also reduces windshield wiper wear because the wiper is operating only a portion of the time rather than continuously, and further, because adequate time between wiping operations elapses to permit accumulation of a sufficient amount of water droplets on the windshield to provide proper lubrication for the blades.

Systems of this type are known which utilize thermal responsive switch elements for disconnecting the motor from its power source at predetermined intervals. There are also systems known, as for example the system shown in U.S. Patent No. 2,987,747 in which various means are provided to periodically interrupt the power source or bypass the power source which drives the wiper motor. In systems utilizing thermal responsive switch elements for effecting periodic dwell of the wiper, the duration of dwell is controlled indirectly by the current through the thermal responsive element. Due to the wide variation in ambient temperature in a motor vehicle erratic operation may occur.

In certain applications it may be desirable to provide an intermittent dwell wiper which incorporates in the gear reduction mechanism associated with the wiper motor a mechanism for producing intermittent motion wherein the wiper can be shifted from intermittent to continuous operation and in which this shifting can be performed substantially instantaneously.

It is accordingly one object of the present invention to provide an improved windshield wiper construction utilizing relatively simplified mechanical linkages to selectively provide either continuous wiper motor operation or intermittent wiper motor operation with intervening periods of dwell between actual cycles of wiper movement. It is a related object of the present invention to provide an improved windshield wiper motor construction which is dependable in operation while not requiring precise parts and which is therefore relatively simple to fabricate.

A further object of the present invention is to provide an improved mechanical linkage associated with a windshield wiper motor which provides continuous or intermittent operation and which permits the instantaneous shifting from intermittent to continuous operation to thereby instantaneously clear large amounts of precipitation which may be suddenly deposited on a windshield while the wiper motor is driving the wipers intermittently.

Another object of the present invention is to provide an improved windshield wiper motor construction for continuous or intermittent operation in which the selective engagement of certain parts thereof to provide the various types of operation is effected silently, positively and without excessive jarring.

A further object of the present invention is to provide an improved windshield wiper motor construction to provide either continuous or intermittent operation wherein certain of the mechanism is not utilized whatsoever when the wiper motor is set to provide continuous operation to thereby prevent wear of said parts and also eliminate any noise which may be realized if said parts were in operation. Other object and attendant advantages of the present invention will readily be seen hereafter.

In order to acheive the above enumerated objects, the present invention includes structure which will be described in detail hereafter and which will be understood when the following portions of the specification are read in conjunction with the accompanying drawings, wherein:

FIGURE 8 is a schematic view of the manually manipulatable control which may be utilized for shifting the wiper motor linkage from continuous to intermittent operation and vice versa;

FIGURE 9 is a fragmentary elevational view of an alternate wiper motor construction, with its cover broken away, showing the mechanical linkage which is utilized for providing either continuous or intermittent wiper operation;

FIGURE 10 is a view taken along line 10—10 of FIGURE 9;

FIGURE 11 is a view taken along line 11—11 of FIGURE 9;

Figure 1:
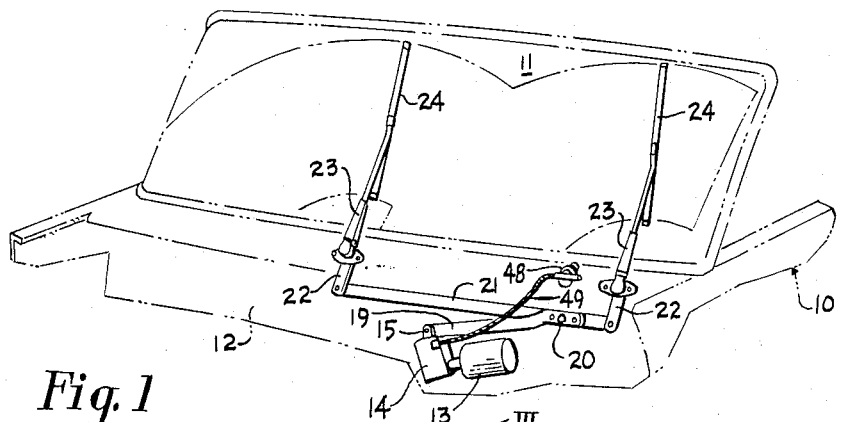
FIGURE 1 is a fragmentary perspective view of an automotive vehicle mounting the improved wiper system of the present invention.

In FIGURE 1 an automotive vehicle 10 is shown having a windshield 11 mounted thereon in the conventional manner. Suitably affixed to the fire wall 12 of the vehicle by brackets, not shown, is a wiper motor 13 having a gear box 14 attached thereto. A crankarm 15 (FIGURES 1 and 3) has one end thereof fixedly mounted on shaft 16 which is driven by wiper motor 13 through the intermediate gearing to be described hereafter. In the foregoing respect crankarm 15 may have a non-circular aperture therein which fits on a mating non-circular portion 17 on the end of shaft 16, a nut 18 retaining crankarm 15 in assembled relationship on said shaft 16. The end of crankarm 15 remote from shaft 16 has elongated link 19 pivotally secured thereto, the other end of elongated link 19 being pivotally secured at 20 to elongated link 21 which has the opposite ends thereof pivotally secured to the outer ends of crankarms 22, the inner ends of which are fixedly mounted on rockshafts, not shown, which are suitably journalled in the cowl of vehicle 10. The ends of the rockshafts remote from their connections with crankarms 22 carry wiper arms 23 which in turn mounts wipers 24. As is well understood in the art, whenever wipers 24 are caused to oscillate, as a result of the operation of motor 13, said wipers will clear moisture from windshield 11.

The improved wiper motor is capable of providing either continuous or intermittent operation of wipers 24, at the selective option of the vehicle operator. In the foregoing respect it will be appreciated that the vehicle operator will require continuous oscillation of wipers 24 whenever the vehicle windshield 11 is exposed to medium or heavy precipitation. On the other hand, when the windshield is subjected to light precipitation or light vehicle wheel spray, intermittent operation of wipers 24 will be desired to clear moisture from windshield 11 which accumulates during the rest periods of wipers 24 between their cycles of movement.

Whenever wiper motor 13 is energized, as by completing an electric circuit thereto by the closing of a suitable switch, not shown, worm 25 will be caused to rotate and therefore cause corresponding rotation of worm wheel 26 which is journalled on shaft 16 which in turn is journalled in bearings 27 and 28 within sleeve 29 and which has its end portion journalled in bearing 29'. Worm wheel 26 will rotate at all times that wiper motor 13 is in operation, whether or not the wipers are caused to operate continuously or intermittently. It is to be especially noted that worm wheel 26 may rotate idly on shaft 16.

Figure 2:
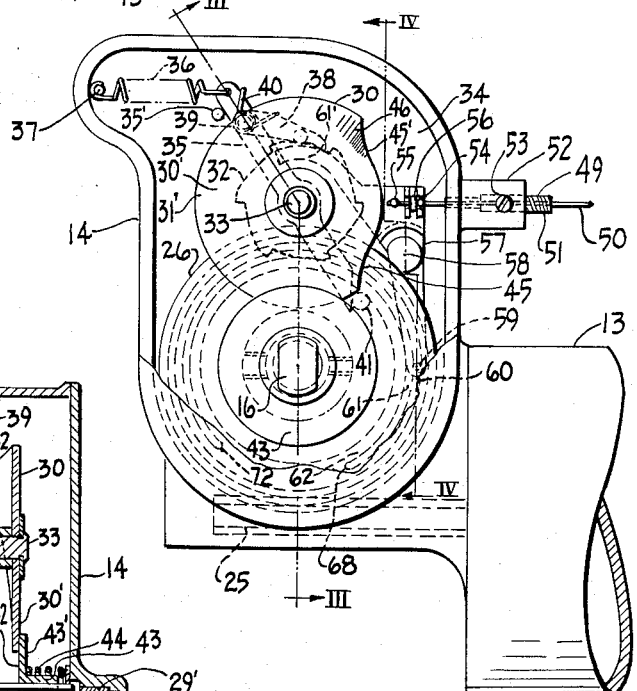
FIGURE 2 is a fragmentary elevational view of a portion of the wiper motor assembly, with its cover broken away, showing the mechanical linkage which is utilized for providing either continuous or intermittent wiper operation.

The mechanical linkage within gear box 14 is shown in the position for driving wipers 24 intermittently in FIGURE 2. In this respect it is to be noted that a cam 30 is fixedly mounted on sleeve 31 (FIGURE 3) which in turn fixedly mounts ratchet 32, said sleeve 31 being rotatably mounted on stub shaft 33 which extends from plate 34 of gear box or housing 14. Also pivotally mounted on stub shaft 33 is the central portion of lever 35. The upper end of lever 35 receives one end of spring 36, the opposite end of which is mounted on pin 37 extending from wall 34 of the gear box 14. A pawl 38 is pivotally mounted on pin 39 which is mounted on the upper end of lever 35. A spring 40 which encircles pin 39 biases pawl 38 in a clockwise direction in FIGURE 2.

Figure 5:
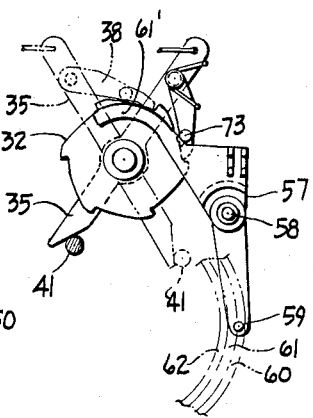
FIGURE 5 is a view taken substantially along line 5—5 of FIGURE 3 and showing the manner in which the ratchet and pawl construction operates during intermittent wiper operation.

A pin 41 (FIGURES 2 and 3) extends from worm wheel 26. Worm wheel 26 rotates in a counterclockwise direction in FIGURE 2. During every revolution of worm wheel 26 a point will be reached, as shown in FIGURE 2, where pin 41 engages the lower beveled end of lever 35 and causes it to move from the dotted line position in FIGURE 5 to the solid line position in FIGURE 5. It can be seen from FIGURE 2 that the end of pawl 38, during the foregoing movement of lever 35, will engage one of the projections (not numbered) on ratchet 32 and drive said ratchet one-sixth of its circumference because ratchet 32 has six points thereon. The ratchet and pawl arrangement provides a positive driving relationship without requiring the preciseness of other types of intermittent drives. After pin 41 loses contact with the lower end of lever 35, spring 36 will return lever 35 to its position with the upper end thereof resting against pin 35', as shown in FIGURE 2, preparatory to a subsequent ratcheting action of the ratchet and pawl mechanism. It will be noted that cam 30 has a first peripheral portion 31' of greater radius than a second peripheral portion 45—45'. As can be seen from FIGURES 2 and 3, during a certain number of strokes of ratchet 32 the face 30' of cam 30 adjacent the peripheral portion 31' of larger radius will be in abutting relationship with the face 42 (FIGURE 3) of clutch plate 43' thereby causing clutch 43, which is keyed to portion 16' of shaft 16, to be held in the position shown in FIGURE 3 against the bias of spring 44. Because there is no engagement between clutch 43 and worm wheel 26, the rotation of the latter will not be transmitted to shaft 16 to drive the wipers through the above described linkage.

Figure 7:
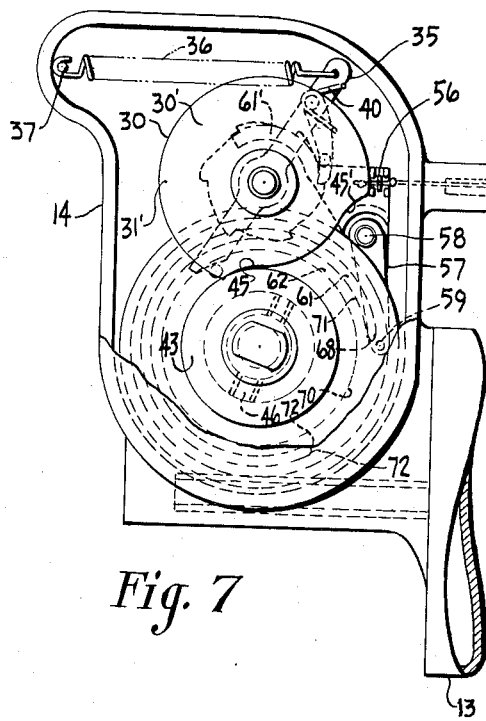
FIGURE 7 is a view similar to FIGURE 2 but showing the orientation of the various components of the linkage immediately prior to the transition from intermittent wiper operation to continuous wiper operation.

However, during stepwise rotation of cam 30 as a result of the action of the ratchet and pawl mechanism, described above, a point will be reached wherein cam 30 assumes the position shown in FIGURE 7 so that the peripheral portion 31' thereof of larger radius is no longer in contact with face 42 of clutch 43 and it is the portion 45 of cam 30 which lies in contiguous relationship to the outer peripheral portion of clutch 43. At this point, cam 30 will no longer hold clutch 43 in the position shown in FIGURE 3 and spring 44 (FIGURE 3) will expand to bias clutch 43 into engagement with worm wheel 26. In the foregoing respect it will be noted that clutch 43 includes a pair of teeth 46 which are received in mating recesses 47 on the hub of worm wheel 26 after clutch 43 moves to the left in FIGURE 3. In lieu of the teeth and recess combination 46—47, frictional engagement is in an axial direction, there is no jarring the hub of worm wheel 26. It is to be noted that since engagement is in an axial direction, there is no jarring on contact of clutch 43 and wheel 26, so that shaft 16 is caused to operate smoothly. After clutch 43 is engaged with worm wheel 26, shaft 16, on which worm wheel 26 previously idled, will be caused to rotate as a result of the driving relationship between clutch 43 and worm wheel 26. This will cause wipers 24 to be driven.

During the foregoing driving of wipers 24, cam 30 will be moved from the position shown in FIGURE 7 to a position wherein the cutaway portion 45' (FIGURE 7) is in contiguous relationship to clutch 43. The foregoing movement of cam 30 will occur in response to the indexing action of the ratchet and pawl mechanism. The next time that pin 41 engages the end of lever 35 so as to actuate the ratchet and pawl mechanism, the inclined surface 46 of cam 30 will move into contact with face 42 of clutch 43, and the rotation of cam 30, as a result of its being driven by the ratchet and pawl arrangement, will cause clutch 43 to move to the right in FIGURE 3 against the bias of spring 44 to thereby cause teeth 46 and recesses 47 to terminate their engagement, to thereby terminate the driving relationship between clutch 43 and worm wheel 26. During the time that clutch 43 is in engagement with worm wheel 26 wipers 24 will provide two cycles of operation. After the foregoing driving relationship is terminated, the ratchet and pawl 32—38 will continue to operate to index cam 30 in a stepwise fashion in response to the rotation of worm wheel 26 until such time as clutch 43 again drops off of cam 30 because of the loss of contact of face 42 of clutch 43 with the face 30' of cam 30. The continual repetition of the foregoing type of operation will result in periodic cycles of movement of wipers 24 with intervening rest periods therebetween. It is in the foregoing manner that the intermittent operation of the wipers 24 is obtained. It will of course be apparent, that in accordance with the broader aspects of the invention, the cam 30 may be formed so as to provide one cycle of wiper operation between intervening dwell periods, or any suitable combination of dwell period and wiper cycling by obvious modification of the cam 30 or the ratchet 32 or both.

Figure 6:
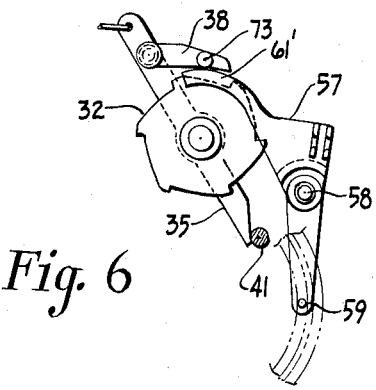
FIGURE 6 is a view similar to FIGURE 5 but showing the condition of the ratchet and pawl construction during continuous wiper motor operation.

The improved mechanism of the present invention also includes an arrangement for shifting from intermittent to continuous wiper operation and vice versa. In the foregoing respect a control 48 is mounted on the vehicle dashboard and is suitably coupled to a Bowden wire unit 49 which is affixed to housing 14. In the foregoing respect the Bowden wire unit includes a core 50 and a wound sheath 51 which is mounted on bracket 52 of housing 14 by set screw 53. The end of core 50 has enlargements 54 and 55 mounted thereon, the portion of core 50 between said enlargements being slidable within an aperture in plate 56 which is held at the upper end of lever 57 (see FIGURES 5 and 6). Lever 57 has a central portion thereof mounted on stub shaft 58 which extends from housing 14. The lower end of lever 57 has a pin 59 thereon which rides in groove 60 (FIGURES 2 and 5) of worm wheel 26 when the mechanism is set for intermittent operation. In the foregoing respect, it can be seen from FIGURES 5 and 2 that the upper arm 61' of lever 57 lies below the upper surface of ratchet 32 when pin 59 rides in groove 60. Thus pawl 38 is able to engage the teeth of the ratchet as a result of the oscillation of lever 35.

In order to shift from intermittent operation to continuous operation, it is merely necessary for the vehicle operator to manipulate Bowden wire unit 49 so as to tend to cause core 50 to move to the right in FIGURE 2. This will tend to bias lever 57 in a clockwise direction about its pivot 58. However there will be no rotation of lever 57 because pin 59, at the lower end of lever 57, is retained within groove 60 of worm wheel 26. Therefore pin 59 will merely bear against ridge 61 which lies between groove 60 and groove 62, which is on the opposite side of ridge 61 from groove 60. Furthermore a detent 64 is provided on the side of control knob 67 to selectively engage either notch 65 or notch 66 in control housing 48'. At this point it is to be noted that sheath 51 has nuts 50' and 51' crimped thereon. A spring 63 is under mild compression so as to cause washers 50" and 51", which are loosely mounted on sheath 51, to bear against shoulders 49" and 48" respectively. After knob 67 has been moved to the right in FIGURE 8 so that detent 64 lies in notch 66, to thereby tend to move core 50 to the right to pivot lever 57 in a clockwise direction about pin 58, spring 63 will have been compressed to cause pin 59 to bear against the side of ridge 61, as noted above. In the foregoing respect when core 50 is caused to move to the right in FIGURE 8 the actual length of core 50 between set screw 53 and shoulder 59" is shortened. This tends to cause the actual length of sheath 51 between set screw 53 (FIGURE 2) and shoulder 59" of control 48 to shorten. Therefore nut 50' will move to the right and cause washer 50" to also move to the right to thereby compress spring 63 because washer 51" is held against movement to the right by shoulder 48". The Bowden wire system is placed under stress as a result of detent 64 having moved into notch 66 while pin 59 at the end of lever 57 remains in groove 60.

Figure 3:
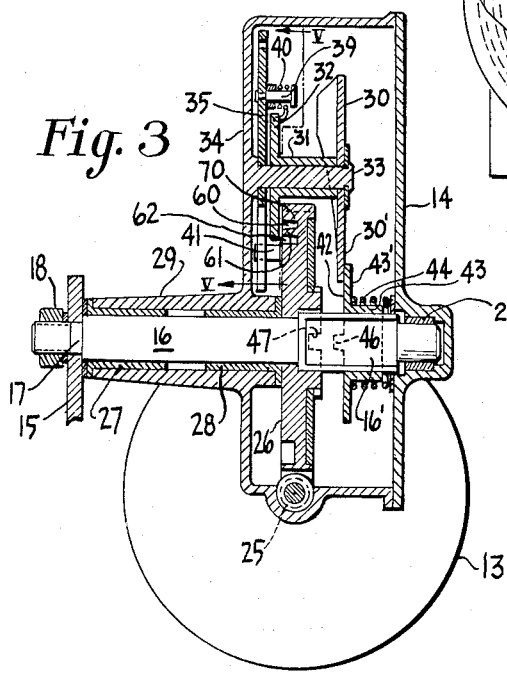
FIGURE 3 is a view taken substantially along line 3—3 of FIGURE 2.
Figure 4:
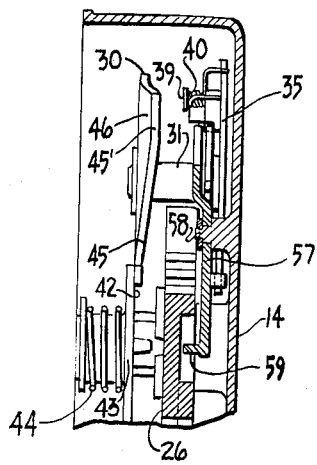
FIGURE 4 is a view taken substantially along line 4—4 of FIGURE 2.

There can be no shifting from intermittent to continuous operation until such time as cam 30 reaches the position shown in FIGURE 7 wherein engagement may be terminated between the face 30' of cam 30 and face 42 of clutch 43. In other words, the disk on which face 42 of clutch 43 is mounted must move from the right of cam 30, as shown in FIGURE 3, to a position to the left of cam 30. When cam 30 reaches the position shown in FIGURE 7, clutch 43 may move to the left in FIGURE 3 under the urging of spring 44 to thereby cause worm wheel 26 to drive clutch 43 and thus drive shaft 16. However it will be noted that when the foregoing movement of clutch 43 to the left occurs, pin 59 on lever 57 (FIGURE 7) will be adjacent the end 68 of ridge 61. However since there is a biasing force on lever 57 as a result of the compression of spring 63, to tend to cause lever 57 to pivot in a clockwise direction, and since pin 59 has cleared the end 68 of ridge 61, lever 57 will pivot in a clockwise direction until such time as pin 59 engages side 70 of groove 62. The foregoing movement of pin 59 is permitted because ridge 61 is discontinuous between the ends 68 and 72 thereof. The reason that lever 57 pivots in a clockwise direction is because when pin 59 is released, the portion of sheath 51 to the left of shoulder 49" will be caused to effectively lengthen by the expansion of spring 63, and sheath 51 will receive therein the left end portion of the core 50 as it is caused to move to the right at its left end and carry lever 57 with it.

The clockwise pivotal movement of lever 57 about pivot 58 will be accompanied by a corresponding clockwise movement of the upper end 61' of lever 57, which engages pin 73 (FIGURE 6) extending from pawl 38 and thus lifts pawl 38 upwardly out of engagement with ratchet 32. In other words, the upper end 61' of lever 57 moves pawl 38 from its dotted line position shown in FIGURE 5 to its position shown in FIGURE 6. It will readily be appreciated that when pawl 38 has been moved upwardly against the bias of spring 40, in the above described manner, the oscillation of lever 35, which is produced by its periodic engagement with pin 41 mounted on worm wheel 26, will be ineffective for driving ratchet 32 because pawl 38 cannot engage the teeth of ratchet 32 during such oscillation of lever 35. It will further be noted that since ratchet 32 cannot be periodically moved in a stepwise fashion, cam 30, which is affixed to sleeve 31 on which ratchet 32 is mounted will also not be able to be moved in a stepwise fashion and therefore once pawl 38 has been moved out of engageable position with ratchet 32, the worm wheel 26 will drive shaft 16 continuously because clutch 43 will remain in engagement with said worm wheel while cam 30 is not being driven.

Because of the action of spring 63, which was described above, a vehicle operator may manipulate control 48 at any time he desires, and the linkage will automatically shift from a condition of intermittent operation to a condition of continuous operation without requiring his subsequent attention and without requiring him to retain a manual force on knob 67.

It will be noted that after the above shifting from intermittent to continuous operation has been effected, pin 59 at the lower end of lever 57 will ride in groove 62 in worm wheel 26. However it may well be that the medium or heavy rain for which continuous operation of the wipers was desired has terminated and the vehicle operator may desire to return the system to a condition of intermittent operation. To this end he need merely push handle 67 of control 48 to the left in FIGURE 8 to thereby cause detent 64 to enter notch 65. This will cause enlargement 54 on core 50 to abut plate 56 to tend to move lever 57 in a counterclockwise direction about pin 58. However, if at the instant that handle 67 of control 48 was pushed, pin 59 is riding in groove 62, pin 59 will merely abut the side of ridge 61, and spring 63 (FIGURE 8) which is compressed, as described hereafter, will tend to bias pin 59 into engagement with ridge 61. However, a point will be reached during the rotation of worm wheel 26 where pin 59 will be in contiguous relationship to end 68 of ridge 61, and pin 59 will move from a position to the left of ridge 61 to a position to the right of ridge 61 (FIGURE 7). This will be accompanied by a corresponding downward movement of the upper end 61' of lever 57 to thereby again permit pawl 38 to engage ratchet 32. It will be noted that the above described counterclockwise movement of lever 57 occurs when cutaway portion 45 of cam 30 is in the position shown in FIGURE 7, the position in which it was stopped when there was shifting from intermittent to continuous operation. Thereafter, movement of cam 30, because of the action of the ratchet and pawl mechanism, will eventually cause clutch 43 to be lifted from a position wherein it was in engagement with worm wheel 26 to a position wherein it was lifted onto face 30' of cam 30, as described in detail above relative to the intermittent action of the instant mechanism. The manner in which control 48 provides the above described delayed action is as follows: After knob 67 is pushed to the left the length of core 50 which extends between shoulder 49'' and set screw 53 is increased. Therefore the amount of sheath 51 surrounding core 50 between the above-mentioned two points must also increase. To do so the right end of sheath 51 must move to the left and thereby cause nut 51' which is crimped on sheath 51 to move washer 51'' to the left away from shoulder 48'' against the bias of spring 63, thereby compressing the latter because washer 50'' is held by shoulder 49'' against moving to the left. After pin 59 at the end of lever 57 is located at the end of ridge 61 on worm wheel 26, lever 57 will pivot in counterclockwise direction because the releasing of pin 59 from said groove will permit spring 63 to expand thereby reducing the effective length of sheath 51 between the above-mentioned points and causing the left end of core 50 to be effectively ejected from the left end of sheath 51 thereby rotating lever 57 in counterclockwise direction.

It is to be again noted that because of the action of spring 63 associated with Bowden cable 50 the vehicle operator need merely manipulate control 67 to a predetermined position and thereafter the shifting from continuous to intermittent operation will occur automatically when the cutaway space in worm wheel 26 between the ends 68 and 72 of ridge 61 reaches pin 59 at the end of lever 57.

The alternate embodiment of FIGURES 9 to 13 differs from the embodiment shown in the preceding figures in that shifting from intermittent to continuous operation can be effected instantaneously upon manipulation of a suitable manually actuatable control. In other words the shifting need not await a predetermined orientation of components within the gear box associated with the wiper motor. Furthermore, certain of the linkage which provides intermittent operation is not motivated during continuous operation so that the wiper motor does not have to carry the load of driving this linkage.

In FIGURES 9 to 13 a wiper motor 100 is shown having a gear box 101 extending from one end thereof. Whenever electrical wiper motor 100 is caused to operate, as by the closing of an electrical circuit thereto in the conventional manner, worm 102 will be driven continuously. Worm 102 is in mesh with worm wheel 103 which is journaled for rotation on shaft 104 which in turn is journaled within sleeve 105 extending from gear box 101. A crank arm 15', which is analogous to crank arm 15 of FIGURES 1 and 3, is fixedly mounted on a non-circular portion 106 at the end of shaft 104 by nut 107 so that crank arm 15' will rotate in unison with shaft 104.

In FIGURES 9, 10, 11 and 13 the components of gear box 101 are shown in a position to provide intermittent wiper operation with a dwell period between cycles of wiper operation. More specifically, as can be seen from FIGURE 9, a bell crank lever 108 is shown mounted on stub shaft 109 which extends from the wall 110 of gear box 101. The horizontal arm 111 of bell crank lever 108 mounts shaft 112 (FIGURE 11) on its outer end. A sleeve 113 is rotatably mounted on shaft 112 and one end of sleeve 113 fixedly carries a ratchet wheel 114 and the opposite end of sleeve 113 carries cam 115. It can thus be seen that ratchet wheel 114 and cam 115, because of their fixed connection with sleeve 113, will rotate in unison. Also pivotally mounted on shaft 112 is the central portion of lever 116. The upper end of lever 116 has one end of spring 117 affixed thereto, the other end of spring 117 being mounted on pin 118 which extends from wall 110 of gear box 101. Thus spring 117 tends to bias lever 116 in a counterclockwise direction in FIGURE 9.

The vertical leg 119 of bell crank lever 108 carries spring biased ball detent 120 which fits into notch 121 or 122 formed in a portion of gear box 101. (Compare FIGURES 9 and 12.) The core 123 of a Bowden wire unit, which has its sheath 124 affixed to gear box 101 at 125, has its end portion extending thru aperture 126 in vertical arm 119. Thus whenever core 123 is moved to the left in FIGURE 9, as by the manipulation of a suitable control on the dashboard similar to control 48 of FIGURE 1, bell crank lever 108 will pivot in a counterclockwise direction about its pivot 109 and assume the position shown in FIGURE 9. On the other hand whenever core 123 is pulled to the right in FIGURE 9 bell crank lever 108 will pivot in a clockwise direction about pivot 109 to the position shown in FIGURE 12. Bell crank lever 108 will remain in the position to which it was moved because of the action of ball detent 120.

As noted above, in FIGURE 9, the components of the gear box 101 are shown in the position which they assume during intermittent operation. Worm wheel 103 will rotate continuously whenever wiper motor 100 is in operation. A pin 127 is mounted on worm wheel 103. As worm wheel 103 rotates in a counterclockwise direction (FIGURE 9) a point will be reached where pin 127 engages the lower end of lever 116 and causes it to pivot in a clockwise direction about shaft 112 against the bias of spring 117. Mounted proximate the upper end of lever 116, on pin 128 protruding therefrom, is a pawl 129 which is biased in a clockwise direction about pin 128 by spring 130. When lever 116 is moved from the position shown in FIGURE 9 to the position shown in FIGURE 13 because of the engagement of the lower end thereof with pin 127, ratchet wheel 114 will be caused to move in a clockwise direction about shaft 112. Since ratchet wheel 114 has six points thereon it will move one-sixth of its circumference each time that pin 127 engages and moves lever 116. Furthermore every time that ratchet wheel 114 is indexed by pawl 129, cam 115 will also move in a clockwise direction in FIGURE 9 because it is affixed to the same sleeve 113 to which ratchet wheel 114 is affixed.

When cam 115 is in the position shown in FIGURES 9 and 10, face 131 of cam 115 will be in engagement with face 132 of clutch 133 and therefore maintain clutch 133 in the posiiton shown in FIGURE 10 against the bias of spring 134 which is interposed between the side of clutch plate 135 which is opposite to face 132 and the cover plate (not numbered) of gear box 101. Clutch 133 is keyed onto shaft 104, the right end of which is journaled at 136 for rotation in the cover of gear box 101 (FIGURE 10). As long as clutch plate 133 is held in the position shown in FIGURE 10, the rotation of worm wheel 103 will not be communicated to shaft 104 and therefore crank arm 15' will not be driven. However a point will be reached during the indexing of cam 115 wherein portion 137 (FIGURE 9) will reach the position shown in FIGURE 13. Thus the surface 131 (FIGURE 10) of cam 115 will no longer be in engagement with surface 132 of clutch 133. Therefore clutch 133 can move to the right under the urging of spring 134 and the teeth 137' and 138' (FIGURE 9) which are mounted on the central portion of clutch 133 will move into engaging relationship with recesses 137'' and 138'' in the hub of worm wheel 103. Therefore since worm wheel 103 is rotated by worm 102 and since clutch 133 is in engagement with worm wheel 103 and is also keyed to shaft 104, the rotation of worm wheel 103 will cause shaft 104 to rotate.

During the foregoing rotation of shaft 104, the wipers which are driven by crank arm 15' will be caused to oscillate back and forth two times across the windshield to clear moisture which has accumulated thereon. Obviously in accordance with the broader aspects of this invention, the wipers may be caused to oscillate back and forth a single time during each rotation of shaft 104 or any suitable number of times by suitable modification of cam 115 or ratchet wheel 114 or both. During this rotation pin 127 will engage the end of lever 116 and cause portion 139 to move into contiguous relationship with clutch 133. The end 140 of cam 115 comprises an inclined surface which lies to the left of face 132 of clutch 133 in FIGURE 10 when plate 135 of clutch 133 lies to the left of face 131 of cam 115. Therefore as cam 115 is again indexed to the right, from the position wherein surface 139 is in contiguous relationship to clutch plate 135, by the action of pin 127 and lever 116 acting on the ratchet wheel 114 thru pawl 129, inclined surface 140 will move into engagement with surface 132 of clutch 133 and move it to the position shown in FIGURE 10 from a position wherein teeth 137′ and 138′ were in engagement with their corresponding recesses to a position wherein such engagement is terminated. This will cause the driving relationship, described above, between worm wheel 103 and clutch 133 to terminate so that the rotation of worm wheel 103 is no longer transmitted to shaft 104 to rotate the latter.

Figure 13:
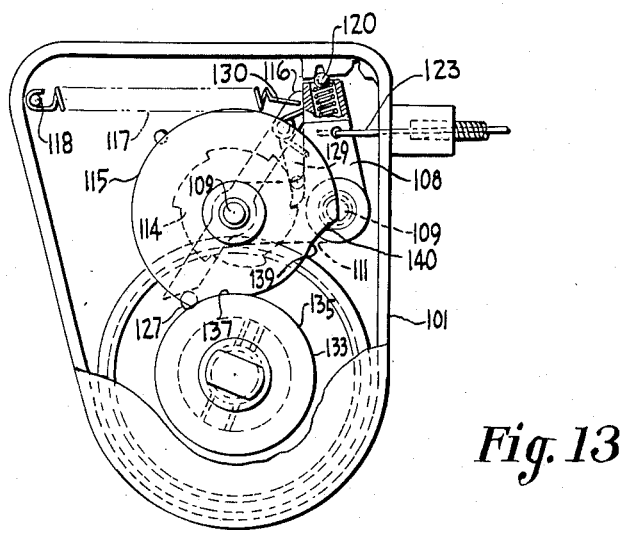
FIGURE 13 is a view similar to FIGURES 9 and 12 but showing the positioning of the various linkages associated with the wiper motor as the linkage causes the wiper motor to drive the wipers to provide intermittent wiper operation.

However while face 131 of cam 115 is in engagement with face 132 of clutch 133 a plurality of periodic indexings will cause cam 115 to return to the position shown in FIGURE 13 whereupon clutch 133 may again move into driving engagement with worm wheel 103 to again provide a cycle of wiper operation. It is to be noted that all of the time that clutch 133 is held away from worm wheel 103 by the action of cam 115, the wipers will not be driven and therefore the length of cam 115 will determine the dwell period between successive cycles of wiper operation.

The embodiment of FIGURES 9 to 13 can shift from the intermittent type of operation described above to continuous operation instantaneously upon the actuation of a suitable control. In this respect it will be noted that whenever the core 123 of the Bowden wire unit is pulled to the right, in FIGURE 9, bell crank lever 108 will pivot from the position shown in FIGURE 9 to the position shown in FIGURE 12. The clockwise movement of bell crank lever 108 will cause horizontal arm 111 thereof to move upwardly from the position shown in FIGURE 9 to the position shown in FIGURE 12. This will raise cam 115 to the position shown in FIGURE 12 so that face 131 of cam 115 moves out of abutting relationship with face 132 of clutch 133. Thus regardless of when bell crank lever 108 is pivoted, the loss of contact between face 131 of cam 115 and face 132 of clutch 133 will permit spring 134 (FIGURE 10) to expand to therefore drive clutch 133 into engaging relationship with worm wheel 103. Furthermore, it will be noted from FIGURE 12 that whenever arm 111 of bell crank lever 108 is raised in the above described manner elongated lever 116 will also be moved upwardly because of the manner in which it is mounted so that the end thereof is not contacted by pin 127 when worm wheel 103 rotates. Because of the action of ball detent 120, lever 108 will remain in the position shown in FIGURE 12 until the core 123 of the Bowden wire unit is again moved to the left to cause bell crank lever 108 to assume the position shown in FIGURE 9. It is to be especially noted that none of the linkage mounted on shaft 112 is driven during continuous operation and therefore the load of such driving is not imposed on the wiper motor. Furthermore, there will be no noise as a result of lever 116 moving back and forth because there is no movement back and forth.

Figure 12:
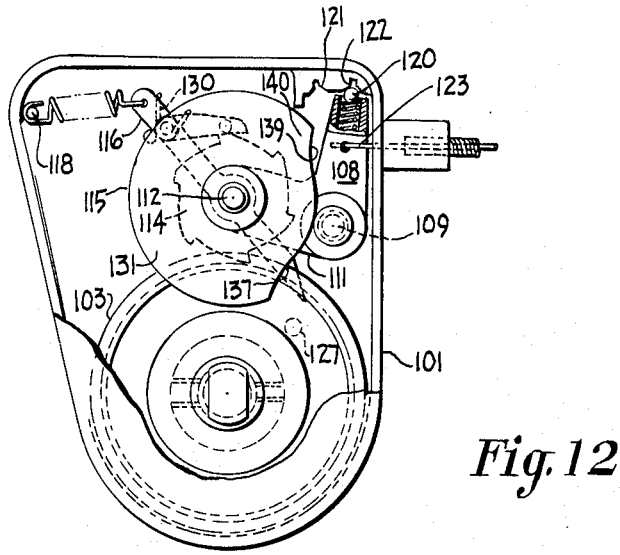
FIGURE 12 is a view similar to FIGURE 9 but showing the condition of certain of the linkages when the wiper motor is set to operate continuously.

In the event it is desired to shift from continuous to intermittent operation, it is merely necessary to cause wire core 123 to move to the left in FIGURE 12 to thereby cause lever 108 to assume the position shown in FIGURE 9 after lever 108 has pivoted in a counterclockwise direction about shaft 109. The foregoing action will cause shaft 112 to move downwardly from the position shown in FIGURE 12 to the position shown in FIGURE 9. However because of the above described expansion of spring 134 clutch plate 135 will have moved to the left of face 131 of cam 115 (FIGURE 10). Thus after cam 115 has been moved downwardly there still will be a driving relationship between worm wheel 103 and clutch 133. In other words plate 135 will lie to the left of cam 115. However it will be noted that the downward movement of cam 115 and shaft 112 upon which it is mounted will also cause lever 116, which is also mounted on shaft 112, to move downwardly where it can be periodically engaged by pin 127 on worm 103. Therefore the rotation of worm wheel 103 will cause the periodic indexing of cam 115 because of the action of pawl 129 on ratchet wheel 114 until a point will be reached wherein surface 139 of cam 115 is in contiguous relationship to plate 135 so that upon the subsequent indexing of cam 115 surface 140 may ride under clutch plate 135 to thereby move it to the right to the position shown in FIGURE 10 against the bias of spring 134.

It is to be noted that the shifting from intermittent to continuous operation is instantaneous upon the actuation of wire core 123 in the above described manner. Thus, if for some reason an unusual amount of precipitation hits the windshield it can be removed instantaneously by merely manually shifting the system from a condition of intermittent to continuous operation. However there may be a slight delay in shifting back from continuous to intermittent operation. However there is no detriment to such type of action because the most that is involved is a few more cycles of wiper operation, after the control for shifting from continuous to intermittent operation is actuated.

It can thus be seen that the above described wiper motor constructions are manifestly capable of achieving the above enumerated objects and while preferred embodiments of the present invention have been disclosed it will readily be appreciated that the present invention is not limited thereto but may be otherwise embodied.

We claim:

1. A windshield wiper motor construction for selectively providing either continuous or intermittent wiper operation comprising: a motor for producing a rotary output, a worm driven by said motor, a worm wheel in engagement with said worm, a first shaft mounting said worm wheel for idle rotation thereupon, a second shaft spacedly mounted relative to said first shaft, a ratchet wheel on said second shaft, a pawl mechanism mounted proximate said ratchet wheel, means on said worm wheel for periodically actuating said pawl mechanism to thereby index said ratchet wheel in timed relation to the rotation of said worm wheel, a clutch, a cam mounted in driving relationship with said ratchet wheel, whereby said cam is driven in timed relationship to said worm wheel, first means operatively associated with said cam for maintaining said clutch out of driving relationship with said worm wheel during the driving of said cam by said ratchet wheel, second means operatively associated with said cam for permitting periodic engagement between said clutch and said worm wheel in response to the driving of said cam by said ratchet wheel, said clutch being effectively keyed to said first shaft whereby said first shaft will be driven when said worm wheel and said clutch are in engagement, and third means operatively associated with said cam for selectively moving said clutch out of engagement with said worm wheel in response to the driving of said cam by said ratchet wheel, whereby the periodic indexing of said ratchet wheel by said pawl in response to said rotation of said worm wheel will cause intermittent engagement of said clutch with said worm wheel to thereby provide the driving of said first shaft to provide a cycle of wiper operation followed by a dwell period when said worm wheel and said clutch are moved out of engagement, said dwell period occurring during the indexing of said ratchet while said means associated with said cam hold the clutch out of engagement with said worm wheel.

2. A windshield wiper motor construction for providing continuous wiper operation or intermittent wiper operation with a period of dwell between successive cycles of wiper movement comprising: a motor, means for providing a rotary output from said motor, a wheel driven by said means providing said rotary output, an output shaft selectively driven by said wheel, axially shiftable clutch means adapted to be selectively operated to positively engage said wheel for causing the output of said motor to be transmitted to said output shaft, selectively operable means operatively associated with said wheel and said clutch means for causing said clutch means to be either in positive, continuous driving engagement with said wheel or out of driving engagement with said wheel, and means operatively associated with said selectively operable means for causing said selectively operable means to be engaged by said wheel only during intermittent wiper operation but having no engagement with said wheel when said wiper motor is set to provide continuous wiper operation whereby the load of said selectively operable means is not imposed on said motor during continuous wiper operation.

3. A windshield wiper motor construction for providing continuous wiper operation or intermittent wiper operation with a period of dwell between successive cycles of wiper movement comprising: a motor, means for providing a rotary output from said motor, a wheel driven by said means providing said rotary output, an output shaft selectively driven by said wheel, axially shiftable clutch means adapted to be selectively operated to positively engage said wheel for causing the output of said motor to be transmitted to said output shaft, selectively operable means operatively associated with said wheel and said clutch means for causing said clutch means to be either in positive, continuous driving engagement with said wheel or out of driving engagement with said wheel, control means for causing said selectively operable means to cause said clutch means to move into engagement with said wheel to shift said wiper motor construction from a condition of intermittent operation to a condition of continuous operation, means operatively associated with said selectively operable means for permitting said selectively operable means to affect said shifting instantaneously in response to the activation of said control means, and means operatively associated with said selectively operable means for causing said selectively operable means to be engaged by said wheel only during intermittent wiper operation but having no engagement with said wheel when said wiper motor is set to provide continuous wiper operation whereby the load of said selectively operable means is not imposed on said motor during continuous wiper operation.

4. A windshield wiper motor construction for providing continuous wiper operation or intermittent wiper operation with a period of dwell between successive cycles of wiper movement comprising: a motor, means for providing a rotary output from said motor, a wheel driven by said means providing said rotary output, an output shaft selectively driven by said wheel, axially shiftable clutch means adapted to be selectively operated to positively engage said wheel for causing the output of said motor to be transmitted to said output shaft, selectively operable means operatively associated with said wheel and said clutch means for causing said clutch means to be either in positive, continuous driving engagement with said wheel or out of driving engagement with said wheel, said selectively operable means including a shaft mounting cam means on said cam for permitting said clutch means to be in engagement with said wheel, means on said cam for causing said clutch means to be out of engagement with said wheel, and means for moving said shaft mounting said cam to move said cam out of engagement with said clutch means to thereby effect the shifting from intermittent to continuous operation.

5. A windshield wiper motor construction for either providing continuous wiper operation or intermittent wiper operation with a dwell period between successive cycles of wiper movement comprising: a motor, means operatively associated with said motor for producing a rotary movement, a shaft, a wheel journaled on said shaft and driven by said means producing said rotary movement, a clutch fixed against rotation on said shaft, a cam spacedly mounted relative to said shaft, said clutch being in cam-follower relationship with said cam, means for selectively moving said cam in response to movement of said wheel whereby said cam periodically permits said clutch to engage said wheel and periodically causes said clutch to disengage said wheel to thereby cause said shaft to be driven when such engagement is effected and to permit said wheel to idle with respect to said shaft when said engagement is terminated, said engagement between said clutch and said wheel being in an axial direction to thereby minimize the shock which is incurred as a result of the rotation of said wheel being transmitted to said shaft through said clutch.

6. A windshield wiper motor construction for either providing continuous wiper operation or intermittent wiper operation with a dwell period between successive cycles of wiper movement comprising: a motor, means operatively associated with said motor for providing a rotary output therefrom, an output shaft associated with said motor, a wheel driven by said means providing said rotary output and journaled for rotation on said output shaft, clutch means effectively keyed to said shaft, cam means operatively associated with both said wheel and said clutch means for selectively effecting engagement and disengagement between said clutch means and said wheel to thereby cause said wheel to selectively drive said shaft, and a ratchet and pawl mechanism driven by said wheel for periodically indexing said cam to thereby determine the relative periods of clutch engagement and clutch disengagement with said wheel, said pawl being driven in timed relationship to said wheel and said ratchet being periodically actuated by said pawl.

7. A windshield wiper motor construction as set forth in claim 6 including means operatively associated with said ratchet and pawl for rendering said pawl ineffective for driving said ratchet.

8. A windshield wiper motor construction as set forth in claim 7 wherein said means for rendering said pawl ineffective includes a lever for moving said pawl so that it cannot engage said rachet.

9. A windshield wiper motor construction as set forth in claim 7 wherein said means for rendering said pawl ineffective comprises means for moving said pawl so that it cannot be actuated by rotation of said wheel.

10. A windshield wiper motor construction for either providing continuous wiper operation or intermittent wiper operation with a dwell period between successive cycles of wiper movement comprising: motor means, output means associated with said motor means, mechanical linkage means operatively associated with said motor means for causing said motor means to either cause intermittent or continuous operation of said output means, and means operatively associated with said mechanical linkage means for causing instantaneous shifting from intermittent operation to continuous operation to thereby permit the immediate removal of accumulations of vision obscuring matter which may be deposited on a windshield during said dwell period.

11. In a windshield wiper system having a wiper motor and wiper driven thereby, the improvement comprising: a mechanical linkage operatively interposed between said wiper motor and said wiper, said mechanical linkage including first means for causing said wiper motor to drive said wiper continuously and second means for causing said wiper motor to drive said wiper intermittently with an intervening dwell period between successive cycles of wiper movement, and control means operatively associated with said mechanical linkage for instantaneously shifting said mechanical linkage from a condition wherein said second means are in operation to provide intermittent operation to a condition wherein said first means are caused to provide continuous operation to thereby permit the immediate removal of accumulations of vision obscuring matter which may be deposited on a windshield during said dwell period.

References Cited in the file of this patent

UNITED STATES PATENTS

| | | |
|---|---|---|
| 1,588,399 | Anderson | June 15, 1926 |
| 2,343,656 | Folberth et al. | Mar. 7, 1944 |
| 2,987,747 | Oishei et al. | June 13, 1961 |
| 3,091,792 | Gute | June 4, 1963 |

UNITED STATES PATENT OFFICE
CERTIFICATE OF CORRECTION

Patent No. 3,118,164                            January 21, 1964

Raymond A. Deibel et al.

It is hereby certified that error appears in the above numbered patent requiring correction and that the said Letters Patent should read as corrected below.

Column 4, line 36, for "is in an axial direction, there is no jarring" read -- may be effected between clutch face 42 and --.

Signed and sealed this 16th day of June 1964.

(SEAL)
Attest:

ERNEST W. SWIDER
Attesting Officer

EDWARD J. BRENNER
Commissioner of Patents